United States Patent [19]

Trautloff

[11] 4,135,766
[45] Jan. 23, 1979

[54] HIGH PERFORMANCE AXLE ASSEMBLY
[75] Inventor: Gary Trautloff, Bellflower, Calif.
[73] Assignee: Henry's Machine Works, Anaheim, Calif.
[21] Appl. No.: 565,468
[22] Filed: Apr. 7, 1975
[51] Int. Cl.² ............................................. B60B 27/06
[52] U.S. Cl. .................................. 301/114; 301/124 R
[58] Field of Search ............. 301/9 CN, 9 SC, 9 AC, 301/9 R, 124 R, 126, 131, 132, 134, 135, 1, 2, 114, 111–113,115, 9 DN, 118; 295/36 Q, 39–43; 403/1

[56] References Cited

U.S. PATENT DOCUMENTS

| 595,863 | 12/1897 | Peacock | 301/135 |
|---|---|---|---|
| 701,356 | 6/1902 | King | 301/135 |
| 713,810 | 11/1902 | Simon | 301/134 |
| 1,587,923 | 6/1926 | Rowanet | 301/9 SC |
| 1,790,737 | 2/1931 | Alborn | 301/9 DN |
| 2,046,779 | 7/1936 | Hack | 301/9 SC |
| 2,231,207 | 2/1941 | Baker | 301/9 DN |
| 2,539,387 | 1/1951 | Alden | 301/126 |
| 3,024,626 | 3/1962 | Frischman | 295/36 R |

FOREIGN PATENT DOCUMENTS 535865  4/1922  France ................ 301/9 CN

Primary Examiner—Robert J. Spar
Assistant Examiner—W. Grant Skaggs
Attorney, Agent, or Firm—Louis J. Bachand

[57] ABSTRACT

High performance rear axle assembly comprising a separable wheel-mounting flange and axle. The flange is fabricated of alloy steel highly resistant to bending stress, and the axle of a different alloy steel more highly resistant to torsional stress. The flange is splined onto the shaft and blocked against bending displacement by a cone interfitting the flange hub.

8 Claims, 3 Drawing Figures

U.S. Patent  Jan. 23, 1979  4,135,766
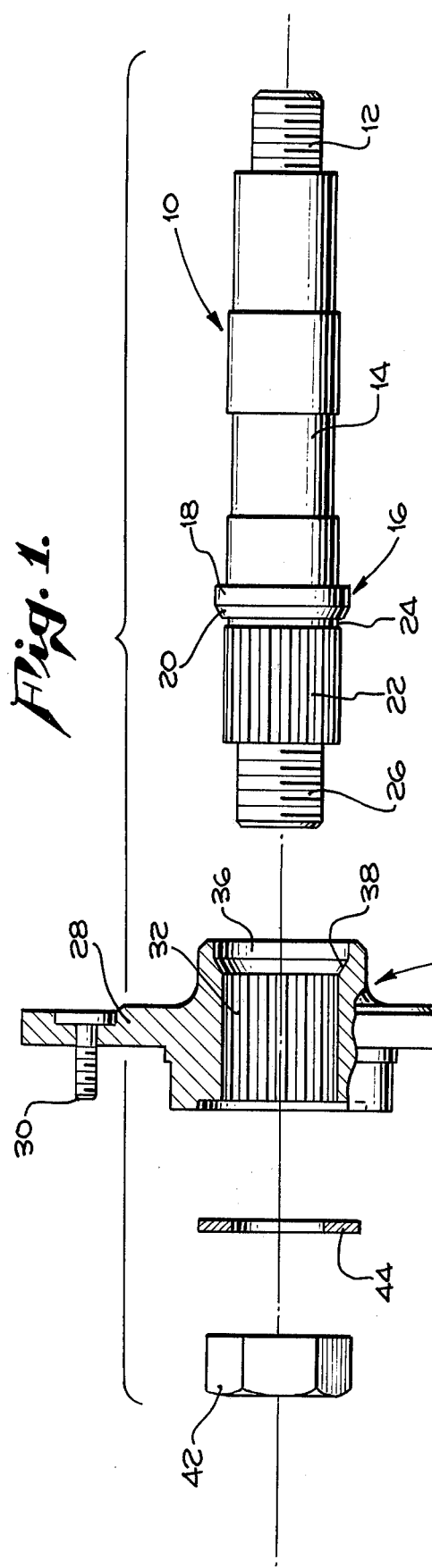
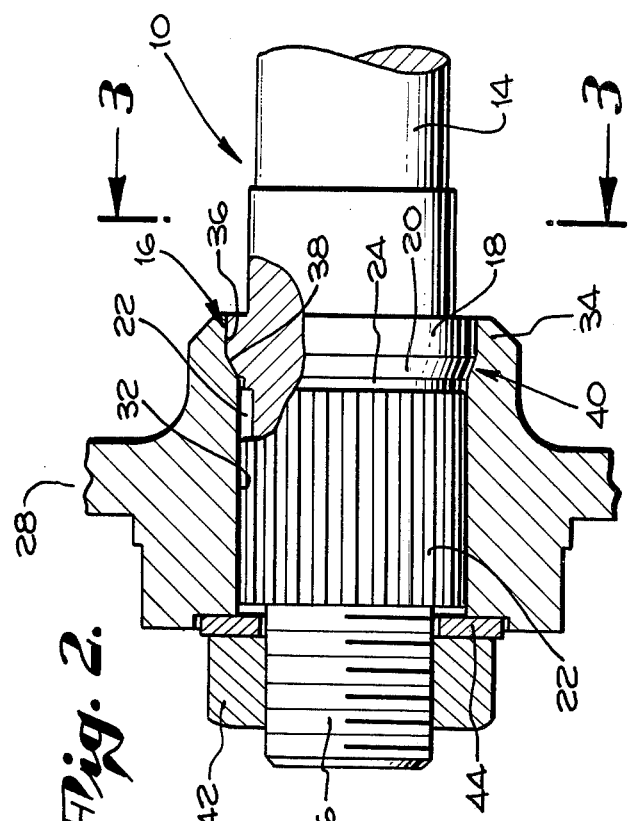
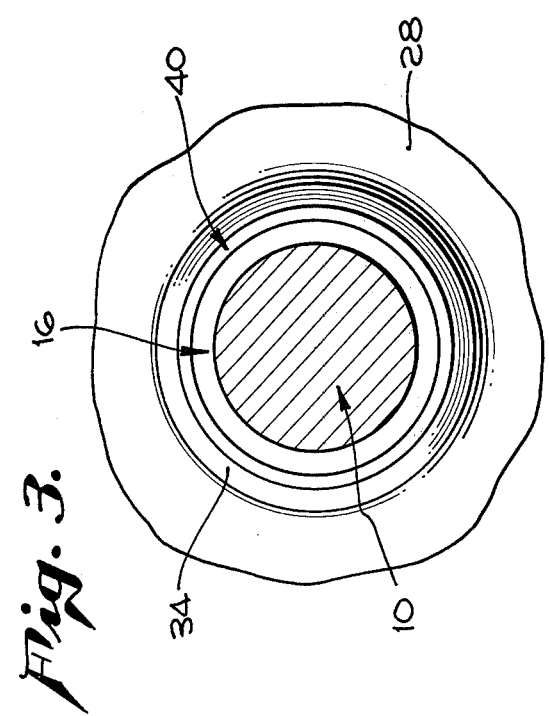

HIGH PERFORMANCE AXLE ASSEMBLY

BACKGROUND OF THE INVENTION

This invention has to do with axle assemblies and, more particularly, is concerned with high performance axle assemblies suited to automobiles intended for racing.

The rear wheels of an automobile are driven by axles which couple the wheels to the propeller shaft through a differential. In so doing, the axle shaft is subjected to tremendous torsional loads as one end is rotated by the differential gearing while the other end is loaded with a wheel of great relative diameter. Under rapid acceleration such as is desired in drag racing, axles having insufficient resistance to torsional (or twisting) stress are subject to catastrophic failure.

The axle typically is provided with a wheel mounting flange which serves to connect the wheel to the axle. In rotating the wheel tends to wobble, subjecting the flange to great bending stresses as the flange rocks about its axle mounting. Suitable flange alloys are available but these are relatively inadequate for axle use, in terms of torsional stress resistance.

PRIOR ART

Heretofore axle and flange combinations have generally been integral assemblies typically forgings in the case of mass produced axle assemblies, or welded assemblies in the instance of lower volume production. Forgings are of only one steel and the steel must be a compromise of torsional stress and bending stress resistance. The result is an axle assembly not sufficiently strong for high performance application. Moreover, the forging process disrupts the atomic structure of the metal which may induce stress failure. Use of two different steel alloys, welded together so as to obtain a torsion stress resistant metal in the axle and a bending stress resistant metal in the flange similarly, by virtue of the welding fusion, disrupts the metal structure believed to be by a crystalline transformation mechanism, and can cause failures.

Failure of an axle assembly is highly dangerous. Usually failure occurs under power and results in a wheel leaving the vehicle in an uncontrolled manner threatening control of the vehicle.

SUMMARY OF THE INVENTION

It is accordingly a major objective of the invention to provide an improved axle assembly avoiding the deficiencies of the prior art. It is another objective of the invention to provide a novel axle assembly structure in which the torsional stress resistance and the bending stress resistance in the axle and flange portions respectively are optimized. It is a further objective to provide such an axle assembly in which rocking or pivoting of the flange about its axle mounting is effectively blocked, and without forging and/or welding of the axle and flange. It is another objective to provide an axle assembly having a separable flange and axle combination.

These and other objectives of the invention, to become apparent hereinafter are realized in accordance with the invention, in a high performance automotive rear axle assembly comprising an elongated axle shaft of a first metal alloy relatively highly resistant to torsional stress and a separable wheel mounting flange of a second and different metal alloy which is resistant to torsional stress and relatively more resistant to bending stress than the first alloy, the flange being splined to the shaft in a plane normal thereto, means operatively connected to the shaft differentially blocking bending stress displacement of the flange, and fastener means carried by the shaft urging the flange into blocking means engagement against displacement from the plane.

Typically, the first alloy has a Rockwell hardness of from about 58 to about 62 $R_c$ and the second alloy a hardness from about 42 to about 48 $R_c$. The axle shaft may be formed with an outwardly tapered portion to define the blocking means, and the fastener means, which may comprise a threaded shaft end portion and a nut, may cooperate with the blocking means to axially clamp the flange on opposite sides thereof.

Preferably the axle shaft is radially enlarged inwardly of the locus of splined engagement with the flange and tapered outwardly to define on the shaft a cone as the blocking means for blocking engagement with the flange, the cone centering the flange in splined relation on the shaft, the flange centrally defining a coaxial socket congruent with the blocking cone. Further the shaft radial enlargement may form a continued cylindrical extent rearwardly of the cone, the flange having a congruent cylindrical extent.

BRIEF DESCRIPTION OF THE DRAWINGS

The invention will be further described as to an illustrative embodiment in conjunction with the attached drawing in which:

FIG. 1 is an exploded view, partly in section, of the high performance axle assembly according to the invention;

FIG. 2 is a vertical sectional view of the assembly in assembled condition; and

FIG. 3 is a view taken on line 3—3 of FIG. 2.

With reference now to the drawings in detail the several components of the high performance axle assembly are shown separated, in FIGS. 1-3 and include, from right to left, the axle shaft 10 having an inboard threaded end 12 for connection to the differential, a central body portion 14 and outwardly thereof a radially enlarged portion 16 defining a cylindrical shoulder 18 and a contiguous frusto-conical shoulder 20. Outwardly thereof there is provided a splined section 22 spaced from the conical shoulder 20 by annular groove 24 and threaded outer terminal portion 26. In practice the frusto-conical shoulder 20 may be grooved parallel to spline grooves by virtue of the spline cutting operation.

The axle shaft 10 is formed of nickel steel to have a toughness sufficient to withstand without failure the extreme torsional loads encountered in drag racing usage. Typical of suitable steel alloys are those containing about 1.5% nickel and preferably 1.6% nickel, and up to 2.0% nickel and having a Rockwell hardness value of not less than about 55 and preferably from 58 to 62 $R_c$. Alloy 4625MB is a highly useful alloy for the axle shaft 10.

The assembly further comprises a flange 28 which serves to mount the vehicle wheel (not shown), secured by bolts 30. The flange is hobbed at 32 to interfit axle splines section 22, as best shown in FIG. 2. The flange 28 includes a hub 34 defining for engagement with axle enlarged portion 16 a cylindrical recess 36 engaging axle shaft cylindrical shoulder 18 and conical recess 38 formed as a coaxial continuation of the recess 36 and engaging axle shaft frusto-conical shoulder 20. Opposite the hub 34 axle portion 16 circular locus of engagement at 40 there is provided a fastener means in the form of nut 42 threaded onto axle shaft terminal portion 26 which acting on washer 44 clamps the hub 34 between the nut and shaft portion 16 in splined relation to the shaft 10.

The combination of the nut 42, and the frusto-conical configuration of the shaft portion 16 serves to block rocking or bending displacement of the flange 28 about the splines interengagement centering the flange on the splines of the axle spline section 22 and precluding misalinement which can be destructive of the axle assembly.

The flange is formed of a steel alloy which is adequately torsional stress resistant, but less so than the shaft, but which is relatively more highly resistant to bending stress such as is encountered when the wheel to which the flange is secured wobbles at high rotational speeds. Useful alloys typically contain chromium and molybdenum, and have a Rockwell hardness of not more than about 50 $R_c$ and preferably between 42 and 48 $R_c$, such as 4130 steel.

I claim:

1. High performance automotive rear axle assembly comprising an elongated axle shaft of a first metal alloy having a hardness of 58 $R_c$ to 62 $R_c$ and relatively highly resistant to torsional stress, and a separable flange of a second metal alloy having a hardness of 42 $R_c$ to about 48 $R_c$ and resistant to torsional stress and relatively more resistant to bending stress than said first alloy, said flange being splined to said shaft in a plane normal thereto and including structure defining a wheel-mounting bolt hole pattern in said plane, means operatively connected to the shaft differentially blocking bending stress displacement of said flange, and fastener means carried by the shaft urging said flange into blocking means engagement against displacement from said plane.

2. High performance automotive rear axle assembly according to claim 1 in which said blocking means and said fastener means axially clamp said flange on opposite sides thereof.

3. High performance automotive rear axle assembly according to claim 1 in which said axle shaft is formed with an outwardly tapered portion to define said blocking means.

4. High performance automotive rear axle assembly according to claim 1 in which said fastener means comprises a threaded shaft end portion and a nut.

5. High performance automotive rear axle assembly according to claim 1 in which said shaft is radially enlarged inwardly of the locus of splined engagement with said flange and tapered outwardly to define on said shaft a cone as the blocking means for blocking engagement with said flange, said cone centering said flange in splined relation on said shaft.

6. High performance automotive rear axle assembly according to claim 5 in which said flange centrally defines a coaxial socket congruent with said blocking cone.

7. High performance automotive rear axle assembly according to claim 6 in which said shaft radial enlargement forms a continued cylindrical extent rearwardly of said cone, said flange having a congruent cylindrical extent.

8. High performance automotive rear axle assembly according to claim 7 in which said flange is axially clamped between said blocking cone and said fastener means, said fastener means comprising a threaded shaft end portion and a nut.

* * * * *